United States Patent [19]
Desmet

[11] Patent Number: 5,958,535
[45] Date of Patent: Sep. 28, 1999

[54] DECORATIVE ELEMENT

[75] Inventor: Norbert Desmet, Meiningen, Austria

[73] Assignee: Bomei AG, St. Gallen, Switzerland

[21] Appl. No.: 08/812,731

[22] Filed: Mar. 6, 1997

[30] Foreign Application Priority Data

Mar. 7, 1996 [CH] Switzerland ............................. 0867/96
Apr. 3, 1996 [CH] Switzerland ............................ 00597/96

[51] Int. Cl.$^6$ .................................................. B29D 23/00
[52] U.S. Cl. ........................ 428/36.91; 428/36.9; 2/167;
2/171; 2/202; 2/206; 2/243.1; 2/244; 26/69 A
[58] Field of Search ............................... 428/36.91, 36.9;
2/167, 171, 202, 206, 243.1, 244; 26/69 A

[56] References Cited

U.S. PATENT DOCUMENTS

| 3,885,015 | 5/1975 | Ono et al. | 264/230 |
|---|---|---|---|
| 4,140,563 | 2/1979 | Sernaker | 156/148 |
| 5,111,760 | 5/1992 | Garzone | 112/403 |
| 5,264,063 | 11/1993 | Martin | 156/247 |
| 5,607,743 | 3/1997 | Hoechst | 428/131 |

FOREIGN PATENT DOCUMENTS

| 0 401 580 | 12/1990 | European Pat. Off. . |
|---|---|---|
| 2 662 268 | 11/1991 | France . |
| WO 90 15895 | 12/1990 | WIPO . |

*Primary Examiner*—Jose' G. Dees
*Assistant Examiner*—Michael A. Williamson
*Attorney, Agent, or Firm*—Lowe Hauptman Gopstein Gilman & Berner

[57] ABSTRACT

The invention makes it possible for a traditional decorative element for expensive embroidered luxury materials namely fine bugle beads, i.e. very small tubes of glass or glass-like other materials, which are conventionally either sewn on directly using complicated hand work or in the form of pre-formed fine bugle beads strung on a thread which is stitched in time-consuming manner, for example using single-head Lorraine sewing machines, to the supporting material, to be manufactured with virtually the same quality but in a simple manner without involving manual work. For this method use is made of a narrow film formed from a multiple layer laminate of different synthetic or natural materials in such a way that during a subsequent treatment, e.g. a heat treatment, the material starts to curve in a pre-determined direction bends up and finally curls and assumes the shape of a bugle bead. The narrow film is applied to the substrate by conventional sequin embroidery techniques.

5 Claims, 4 Drawing Sheets

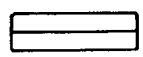
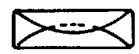
FIG. 3d    FIG. 3c
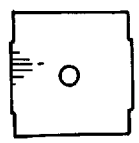
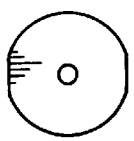
FIG. 3b    FIG. 3a
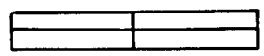
FIG. 4d    FIG. 4c
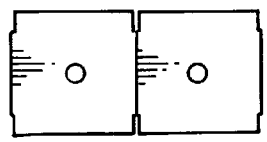
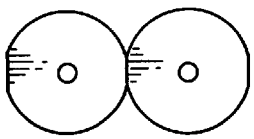
FIG. 4b    FIG. 4a
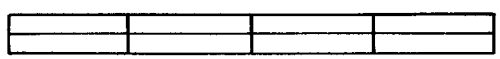
FIG. 5d    FIG. 5c
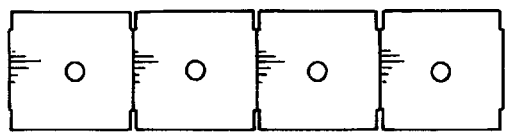
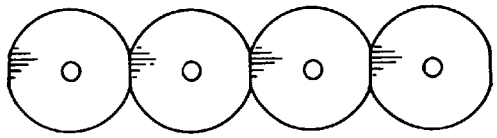
FIG. 5b    FIG. 5a

DECORATIVE ELEMENT

The invention relates to a method for the manufacture of a decorative element for use on textiles, as well as semi-manufactured decorative elements made by such method which can be starting materials for corresponding decorative elements for textiles, and the final decorated textile products made therefrom. It more particularly refers to an improved means of making beads, particularly hollow beads and the like, and their use in connection with textile fabrics.

BACKGROUND OF THE INVENTION

A traditional decorative element for expensive embroidered luxury textile materials is constituted by a suitable fabric substrate having small glass tubes, known as bugle beads, finely stitched thereon. Conventionally, the very small bugle beads are directly stitched on to the fabric substrate either by means of complicated hand work, or the fine bulge beads, which have previously been strung up on a thread, are stitched on to the supporting textile material in a time-consuming manner using a single-head Lorraine sewing machine. This makes the final product, which is a composite of the decorative bead materials and the textile substrate, expensive and labor intensive due, in particular, to the required hand work.

The problem occasioned by this state of the art is to provide a method by means of which, in a simple and largely mechanical manner, bugle bead-like decorative elements with a very high esthetic effect can be created. In particular, the improvement of this invention permits and encourages the use of existing mechanical means and knowledge in the field, so that the method of manufacturing such materials can be easily accomplished and widely disseminated, and therefore is not bound to special machines which must be acquired beforehand.

Since 1966 certain sequin units have been available, which are used on automatic Schiffli embroidery machines. Since that time, these units and machines have become used throughout the world. In all these sequin supply units, pre-punched narrow films are brought, by fine advance cam wheels, upstream of the needles of the Schiffli embroidery machine. Following the first needle penetration through these films, the sequins are separated from the film by a cutting knife, which is synchronously associated with the multiple advance units, and are then embroidered onto the base textile material as individual sequins. This has become a standard commercial procedure for applying sequin embroidery.

OBJECTS AND GENERAL DESCRIPTION OF THE INVENTION

It is therefore an object of this invention to provide a novel method for forming beads, or the like, decorative embellishments for use in connection with textile substrates.

It is another object of this invention to provide the novel beads, or the like, made by such method in finished condition, adapted to the applied to a suitable substrate, such as a textile material.

It is a further object of this invention to provide a finished textile material, or the like, having the novel beads, etc. of this invention applied thereto.

Other and additional objects of this invention will become apparent from a consideration of this entire specification including the drawing hereof.

In accord with and fulfilling these objects, one aspect of this invention resides in a novel method of forming decorative elements such as beads, or the like, especially those beads which are known as bugle beads. The instant invented method for creating a novel decorative element which is adapted to be applied to a textile substrate, inter alia, can use this same type of embroidery procedure that is per se known in the art for applying sequins to textile substrates, with the modification that the above mentioned cutting knife is not actuated in all cases following the first needle penetration through the film or the sequin because this invention is not exclusively concerned with embroidering sequins or anything else onto textile substrates.

According to one aspect of this invention, use is made of a narrow film, which is suitably formed from a laminate of multiple layers, each layer being composed of one or more materials having different coefficients of expansion and contraction, in such a way that the multi-layered material is caused to curve in upon itself during a subsequent treatment. The downstream, or subsequent, treatment causes the multi-layer material to start to curve in a predetermined direction, with the sides bending up and curling inwardly, until the curled material assumes the shape of a small tube, or bugle bead. It is an important aspect of this invention that at some point during the curving of the multi-layered material, the curled shape is stabilized and fixed so that it will not unroll, nor will it roll further. The curling process preferably takes place from the sides defining the width of the narrow film (i.e., not from the ends, or lengthwise of said narrow film) so that following the treatment there is a longitudinal bugle bead which has become stitched (attached) to the substrate.

The decisive directional stability, that this process applies to the elements which are being attached to the supporting material, is achieved such that the advance unit does not embroider each sequin, but instead, as desired, two, three, four or five, etc. sequins may be cumulatively attached to the substrate before the cutting knife is activated. The thus fixed sequins can no longer rotate in an arbitrary manner around the thread penetrating perforation therein, as is the case in conventional sequin embroidery. Instead they are kept on the supporting material with their length or tube axis being generally fixed This fixing is oriented in a desired direction, namely at 90° to the desired tube forming curling direction. It is also within the scope of this invention to achieve directional stabilization by the pre-punching of sequin forms with two or more perforation holes, preferentially longitudinally disposed multiple perforations, through which thread or other affixing means can be applied.

When using multi-layer material, which will form bugle beads from circular or oval shaped sequins as a result of the downstream treatment which causes the material to curvingly bend up or curl, an optically pleasing effect can be obtained. The edges of the sequin remains visible as the curled edges of the formed bugle bead. If the two or more layers or sides, of the multi-layer laminate material of the original narrow film, have different colors, a two, or more, color edge effect(s) can be achieved which can lead to very attractive additional patterning. However, if such a visible edge effect of the curling is to be avoided, then in place of the circular or oval standard sequin, a narrow film can be so pre-punched that the necessary fine cut neck is replaced by a laminate punched to within a few fractions of a millimeter precisely matched with the conveying holes required by the advance apparatus. The plates on or of the film are preferably, but not necessarily, rectangular. Here again there is no cutting of the plates, but instead, as desired, two or more laminated plates are pre-cut in order to ensure flexible patterning. When the sequin-like appliqué is rectangular, the inwardly curling operation enfolds the upper surface of the topmost laminate layer. In this form the original top of the sequin is completely trapped within the hollow interior of the bugle bead that has been formed.

BRIEF DESCRIPTION OF THE DRAWING

Preferred operating procedure(s) and embodiment(s) of the invention are described in greater detail hereinafter relative to the attached drawings, in which:

FIGS. 3a and b are each plan views of, respectively, a rectangular and a circular starting element (sequin appliqué) for use in this invention.

FIGS. 3c and d are each plan views, respectively, of these same elements after they have been treated to cause them to curl up, and to thereby form bugle beads, according to this invention.

FIG. 4a, b, c and d depict the same elements as shown in FIG. 3 except that in each case two such starting elements are shown joined together.

FIG. 5a, b, c and d are similar to FIG. 4 except that four (4) starting elements are shown joined together.

DETAILED DESCRIPTION OF THE EMBODIMENTS OF THIS INVENTION

Figure 1:
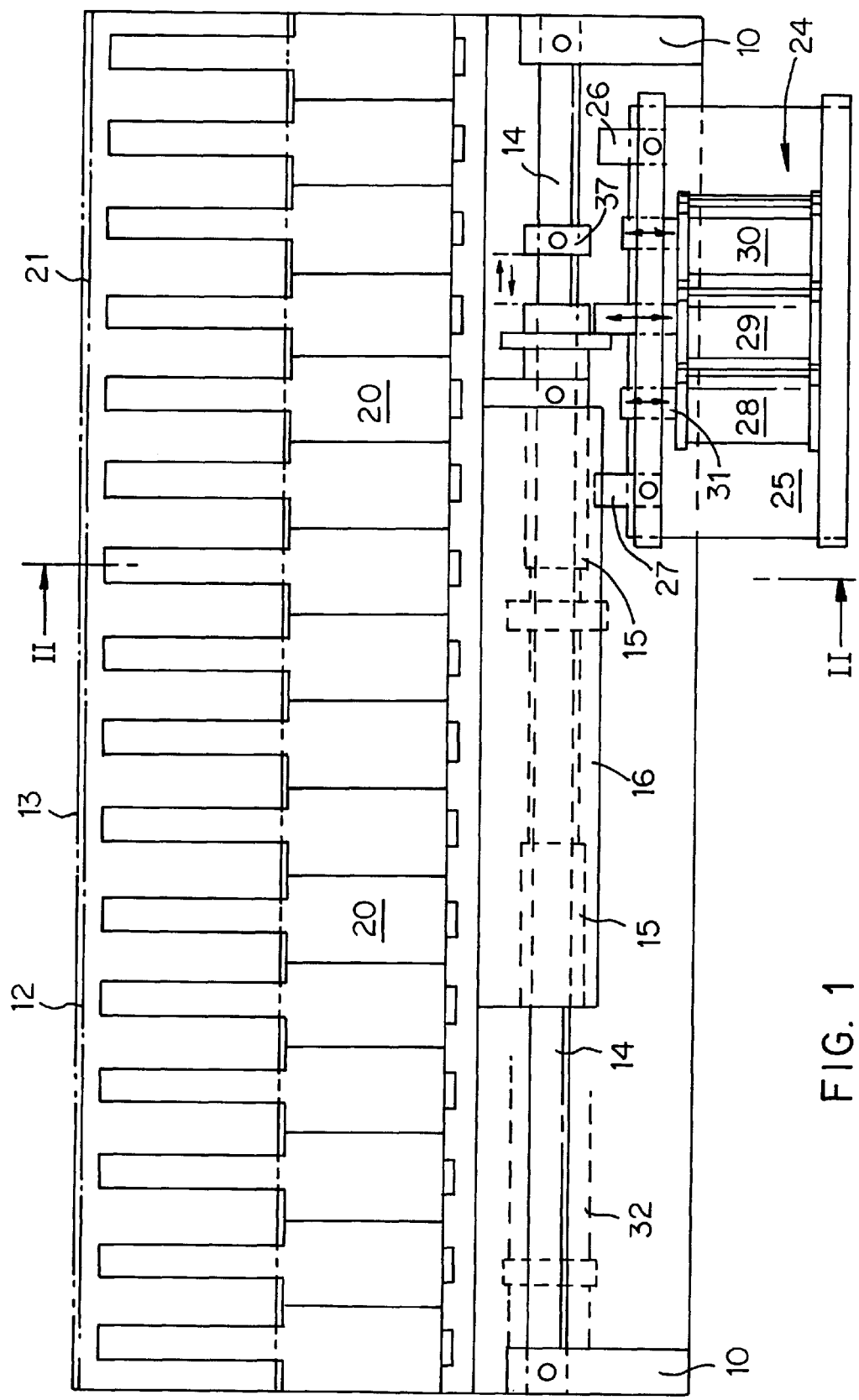
FIG. 1 is a plan view of a widely used sequin applique unit for use on a commercial Schiffli embroidery machine.
Figure 2:
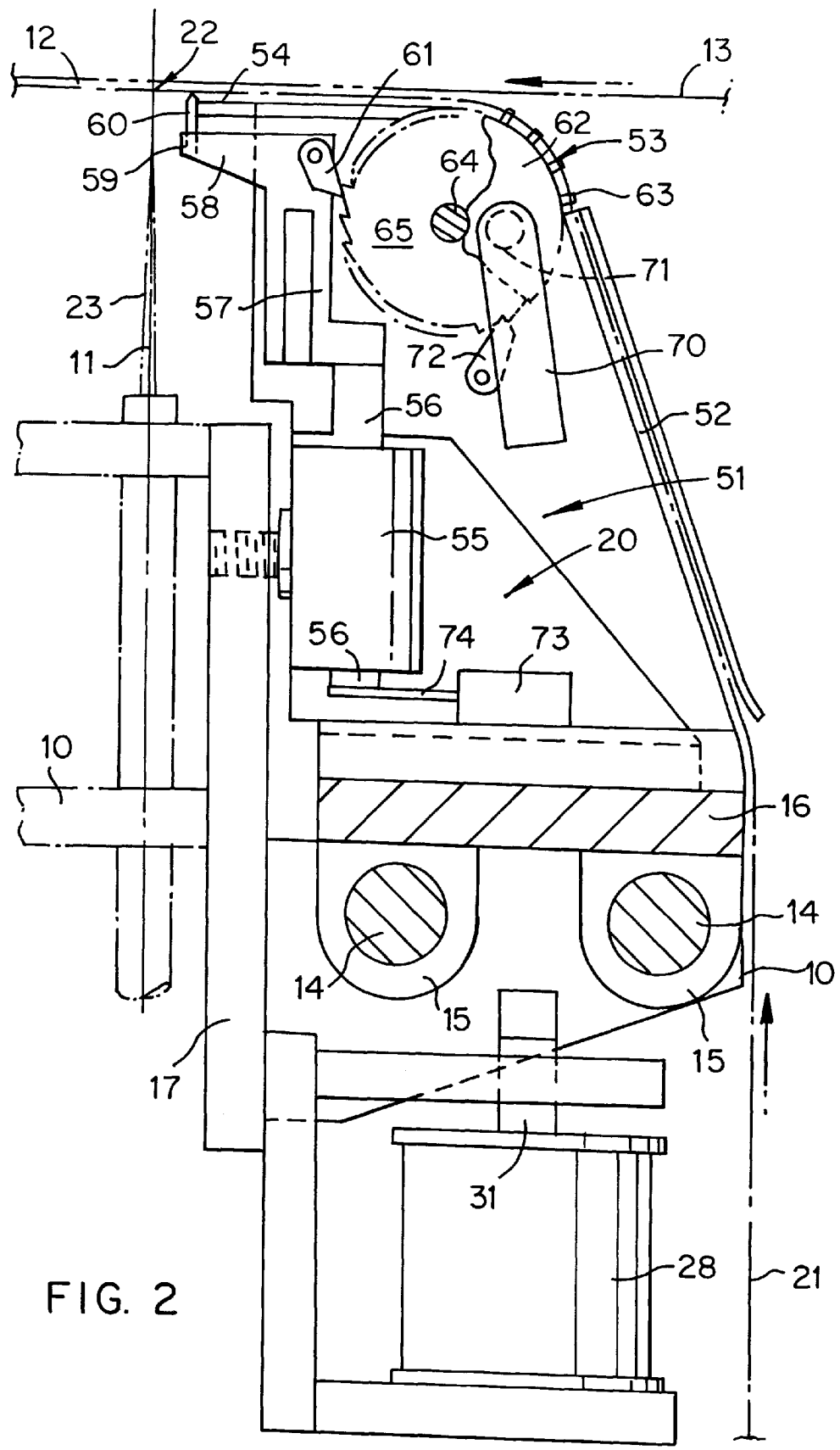
FIG. 2 is an elevation of the unit shown in FIG. 1 in cross-section.
Figure 6:
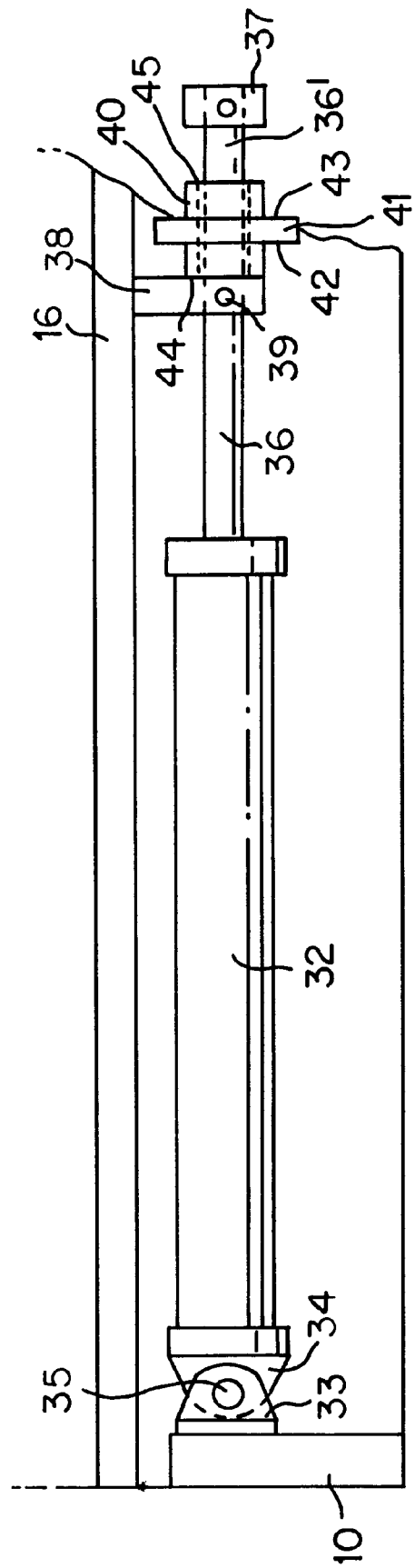
FIG. 6 is an elevation showing detail of the ram assembly shown in FIG. 1.

With reference to the aforementioned adaptability of the method of this invention, and to better illustrate the same, at this point a preferred operating unit, which is adapted for cooperation with a known Schiffli embroidery machine, is shown. FIG. 1, FIG. 2 and FIG. 6 which show the general construction of the unit, are described in detail in patent application EP-219,971 with respect to applying sequins to a substrate fabric, the entire contents of which are incorporated herein by reference.

Referring now to FIGS. 1, and 2 of the drawing, the appliqué machine to be used in this invention comprises erect support frame members having extended therebetween a substantially horizontal support frame supporting a plurality (16 are shown in the instant drawing, but this number is not in any way limiting) of needle assemblies. In spaced relationship between the frames 10, the needle axis 11 (see FIG. 2) is regularly spaced along the needle support bar (not shown). The erect frames 10 are in spaced relationship with the plane 12 of a fabric which is intended to have decorations applied thereto by this machine. The fabric 13 is maintained in the plane 12 by being supported in a frame (not shown) which is adapted to move with respect to the needle axis in order to enable the desired stitching pattern to be applied. The frames 10 further support a pair of vertically spaced cylindrical rods 14, suitably made of hardened steel, which are bolted and fixedly secured thereto.

Each rod 14 carries a pair of spaced sleeves 15 each of which is secured to a carriage body 16, with the sleeves being capable of axial sliding movement along the hardened steel rods 14. The carriage body 16 carries a substantially horizontally disposed module mounting plate 17 which is fixedly secured to the carriage body 16. Sleeves 15 are incorporated in the carriage body 16. The module mounting plate 17 carries a plurality (in the depicted embodiment. 16 are shown) of feeder modules 20 as will be hereinafter described.

As seen in FIG. 2, each feeder module is adapted to supply a strip 21, comprising a plurality of materials to be applied to the fabric substrate. In the cited European patent, the applied materials are sequins. According to this invention, these applied materials are the precursors of the formed bugle beads. These materials, joined end to end to comprise a strip, are fed to a stitching station, which is indicated generally at 22, with a hole in each individual material element being presented at the stitching station(s) in registry with the needle axis 11 of the needle 23 in juxtaposition with the module 20. The needles 23 are fixed with respect to the frame 10, whereas the modules 20 are carried by the carriage body 16 which is slidable with respect to the fixed rods 14 and hence is moveable laterally with respect to the fixed needle axes.

On the side of the frame 10, remote from the fabric plane 12, there is provided an indexing mechanism 24 comprising a base plate and a support frame 25 fixedly secured with respect to the frame 10 (see particularly FIG. 1). The indexing mechanism support frame 25 has along its edge which is juxtaposed rods 14, a pair of spaced abutment members 26 and 27, and further supports three (3) solenoids 28, 29, and 30, each of which has an armature coil 31 which is moveable between a retracted and an extended position. The arrangement of these elements is such that the diameter of each abutment 26 and 27, and each core 31 of the solenoids 28, 29 and 30, respectively, are of the same diameter and further such that the axes are equally spaced apart to correspond precisely with the spacing between adjacent needles on the needle frame. This provides five abutment stops for control of the movement of the carriage 16.

The carriage 16 is driven by means of a pneumatic ram 3 which is supported on one of the frames 10 by means of inter-engaging trunnions 33 and 34, which are secured with respect to each other by means of a securing pin 35. The ram 32 is provided, at the other end with a ram rod 36 having at its extremity, an annular stop 37. It carries intermediate of its length, an arm 38 which is fixedly secured to the rod 36 by means of a pin 39 and is fixedly secured to the carriage body 16. This arrangement permits movement of the ram 36 to be transmitted to the carriage body 16. The portion of the ram rod 36' disposed between the annular stop 37 and the arm 38 carries a sleeve 40 having a central flange 41 defining first and second abutment surfaces 42 and 43, respectively. The sleeve 40 is capable of sliding between a position in which its first end face 44 abuts the adjacent surface of the arm 38, and a second position in which the second sleeve end face 45 abuts the adjacent annular surface of the annular stop 37.

In operation, with all of the solenoids disabled so that the core 31 of each solenoid is in a withdrawn position, actuation of the ram to extend the ram rod 35 results in the ram, and correspondingly the carriage 16, moving until the second abutment surface 43 of the annular flange 41 engages with the extremity of the first abutment member 26. The lost motion of the sleeve 40 permits continued movement of the ram rod until the first end face of the sleeve 44 is in abutment with the corresponding surface of the arm 38. In this position, the carriage 16 will be at the extremity of its travel and the modules 20 will be in alignment with corresponding needles 23 whereby allowing a stitching operation by at least some of the needles 23 to stitch a material element(s), presented at the stitching station 22, to the fabric 13. Throughout the stitching operation, air is supplied under pressure to the ram in order to maintain the ram in firm abutting relationship with the end stop 26 through the mechanism of the lost motion sleeve 40 to ensure accurate registration of the needle 23 with a material element presented at the stitching station 22 by means of a module 20 on the carriage 16.

Release of the pressure in the ram 32 and the application of pressure to withdraw the ram in a left direction, relative to the positions shown in FIGS. 1 and 2, will result in disengagement of the flange 41 from the member 26 until continued movement of the ram brings the first abutment surface 42 of the central flange 41 into engagement with the second abutment member 27. Continued withdrawal of the ram will result in further movement of the ram rod 36 with respect to the sleeve 40, which is being held stationary by the second abutment member 27 until the annular stop 37 engages the second end face of the sleeve whereby preventing further leftward movement of the ram producing movement of the carriage 16 corresponding to five (5) module places with respect to the needle bank, thus permitting a second type or color of material element to be brought into registration with the needles. Registration is insured because the lost motion of the sleeve 40 corresponds precisely to the diameter of the abutments 26 and 27. Intermediate positions between the one and tile five positions, namely two, three or four positions, for the module may be effected by activating one of the solenoids 28, 29 or 30 to extend its core, as shown by the coil 29 in FIG. 1, to engage with the flange 41 thus producing alignment of the third or middle module within the group for operation in combination with a given needle. The lost motion sleeve 40 provides the means of positive location of the module with the needle axis irrespective of the direction of throw of the ram. If the ram is moving toward the right, as shown in FIG. 1, then the contact between the core 31 of the coil or solenoid 29 will be between the second abutment face 43 of the flange 41 via the first end face 44 and the arm 38, whereas leftward movement of the ram rod 36 will cause the abutment to be on the other side of the core or armature 31 of the coil 29 between the first abutment surface 42 of the central flange 41 via the second end face of the sleeve 40 and the annular stop 37.

The feeder module 20 comprises a housing 51, suitably formed of an injection moldable material such as for example glass filled nylon, having, in an exterior surface, a tape path 52 extending about a tape drive 53 to a dispensing and indexing area 54. The housing 51 accommodates on the side thereof adjacent the module mounting plate 17, a coil 55 having a central armature 56 which is cranked at 57, toward the needle axis, which latter part 57 carries at its distal end a further cranked portion 58 extending from the axis of the armature 56 toward the needle axis 11. The extremity 59 of the further cranked portion 58 carries a pin 60, the axis of which is in spaced parallel relationship with the needle axis 11 which is adapted to extend into the tape path 52 to engage with the central hole of a tape passing along the path 52 to hold the penultimate material element on the tape relative to the module 20, thus aligning the hole of the end element with the axis 11 of the needle 23. The inner extremity of the cranked portion 58 is provided with a pawl 61 while the armature 56 is spring loaded to a datum position with the pin 60 extending into the tape path 52 in its engaging position.

The housing 51 carries a tined wheel 62 having a plurality of tines 63 adapted to engage with the central hole of each element whereby movement of the tined wheel 63 will produce corresponding arcuate movement of the tape along the tape path 52 where the tines 63 interact with the path. The tined wheel 62 is journalled for rotation about an axle 64 which also carries, for rotation with the tined wheel with a ratchet 65 for engagement with the pawl 61. The pawl 61 is suitably spring loaded (not shown) into engagement with the ratchets on the wheel 65.

The housing further includes a spring strip 70 which is secured to one surface of the housing 51 and which carried at its outer extremity a friction pad 71 which is adapted to bear against the side face of either the tined wheel 63 or the ratchet wheel 65 to damp the motion of the wheel upon operation of the solenoid 55. A second pawl member 72 is spring loaded into engagement with the ratchet wheel 65 to prevent any movement of the tined wheel 62 which might tend to reverse the movement of the tape along the tape path 52. The lower portion of the housing accommodates a microswitch 73 having an actuating arm 74 which is adapted to engage the lower extremity of the armature 56 of the solenoid 55.

It is pointed out here that the starting position for the manufacture of the decorative element according to this invention is substantially the same as is the starting position required for embroidering sequins onto a textile material substrate. Thus, the invention can be performed with limited additional capital costs which ensures the technical transferability of this technology which enables achieving a widespread use of the inventive method hereof.

From a myriad of possible different sequin shapes which are useful in this invention, FIGS. 3 to 5 show a few of these as the means of illustrating the basic principle. For ease of understanding, rectangular starting elements are shown as examples which are useful for the manufacture of bugle beads according to this invention. These require a specially configured narrow film. When using a narrow film which has been cut for sequin shapes and therefore is in the shape of a circular starting element, according to the inventive treatment described herein the curving in, bending up and finally curling a highly decorative, tubular structure is obtained with inclined cut tube ends. If in place of individual elements multiple elements are used, as shown in FIGS. 4 and 5, then in the case of rectangular basic elements, a series of bugle beads are obtained over the entire element length. In the case of the circular or elliptical basic elements, bugle beads are obtained with sloping longitudinal end indentations, which can have a very attractive appearance and through which the original top surface of the laminated multi-layer forming material is visible.

Embroidering or sewing on of the basic elements that is the film or tape, takes place according to techniques which are per se known in the prior art for application of sequins, and requires no special measures, apart from the special control and activation of the conventional cutting knife. The special measures which form a significant part of this invention occur in connection with the manufacture of the narrow film starting element, and the subsequent treatment of the basic elements after they have been affixed to the substrate.

Great significance and care should be attached to the direction in which the narrow film is cut with respect to the direction in which the material finally curves (its bending up or curling direction). Using the example shown in FIG. 3b, it is possible to choose a rectangular basic element in such a way that two opposite ends bend towards one another, while the other two opposite ends do not curl up to any significant effect. Similarly, with a circular or elliptical starting element, two facing "sides" are so constructed that they will bend towards one another, while the other two facing "sides" do not appreciably curl tip. With the circular basic element shown in FIG. 3a, due to the greater degree of freedom afforded by the circumference rather than distinct sides as shown in the starting element of FIG. 3b, it is possible to choose the curling elements in such a way that two peripheral points at the end of a first diameter approach one another on bending up and curling, while points at the ends of a second diameter which is normal to the first diameter tend to remain uncurled. The bending up and curling of circumferential points located at ends of a segment lead to a bag-like upward bending of the basic element as they approach each other. With embroidery of a longitudinally joined together, cohesive multiple basic element, as shown in FIGS. 4 and 5, it is only possible to bend the longitudinal sides or edges which are not connected to each other as are the lateral edges, towards one another.

The special shaping treatment of this invention takes place after the fixing of the decorative material to the substrate. This multi-layer material may for example comprise a laminate of different polyester films, such as are sold under the Mylar trademark and name, e.g. a Mylar 36 layer and a Mylar PET film layer 23. Each of these layers may or may not be dyed and may or may not be vacuum metallized or otherwise coated. The different colors and metallic effects which can thus be applied by using additional decorative factors not further discussed here. The lamination of the two or more individual layers can be accomplished in known manner. The pairing of the layers is intended to permit or cause a subsequent treatment, e.g. a subsequent heat treatment, to effect a greater shrinkage of one layer with respect to the other layer(s). This differential thermal expansion or contraction forces one layer to move further than its neighboring layer, so that a curvature of the combined layers is obtained, which in the case of appropriate pairing of suitable layer materials leads to complete curling of the laminate.

In one specific embodiment of this invention, the laminated multi-layer material is sewn onto a textile substrate through appropriate holes (perforations) as in sequin attachment, and then the heating of the laminate of the aforementioned multi-layered material proceeds as follows:
1) heating of the material at approximately 220° C. for no longer than about minutes,
2) maintaining the material at that temperature for about 30 seconds, during which the multi-layer material is annealed and the thermal dynamics in the two materials are calmed,
3) lowering the temperature e.g. with the aid of assisting infrared, for about 60 seconds to a "shaping temperature", e.g. between about 150 and 100° C. during which the material curves and starts to upwardly and inwardly bend, and on reaching the desired shape
4) a sudden cooling to a temperature of at most about −10° C. for stabilizing or setting the shape obtained.

As a function of the particular materials from which the layers of the laminate are formed, other temperature controls are required and the specific temperature regimen that is suited to use in each case be determined. The choice of the laminates and the resulting subsequent treatment by heat irradiation gases, vapors, etc. is also dependent on the textile substrate to which the decorative elements are fixed. Care must be taken not to deform of damage the textile substrate by excessive application of heat. Thus, the materials of the layers of the laminate and the materials of the textile substrate must be coordinated with each other to ensure thermal stability.

This invention is not limited to post thermal treatment in order to cause the laminated multi-layer starting material to curl into the desired bugle bead, or other, form. Other subsequent treatments are possible, and will occur to those of ordinary skill in the art. These treatments are all intended to be embraced by the scope of this invention provided they lead to a planned warping of laminates and which can be used to achieve further effects. Of course, care must be taken to choose a textile substrate, a starting element composition and a post (subsequent) treatment regimen that are mutually compatible.

The method can be used for modifying decorative single elements. Whereas up to now sequins of any shape are constituted by planar plates, the method according to the invention can give said plates a convex or concave shape and which, e.g. in convex form, can produce a marked optical effect. With the use of different materials for the films, laminates or single-layer structures the most varied effects can be obtained, such as mixed forms of curved, curled, concave, convex and other arrangements.

I claim:

1. Semi-manufactured article, comprising a textile substrate having a bendably deformable film embroidered thereon, which film comprises a laminate comprising a plurality of layers,
    wherein at least one of the layers shrinks more than other layer(s) during a post embroidery treatment of said article thereby bending said film upon itself to form a tubular structure by means of said post embroidery treatment.

2. Semi-manufactured article according to claim 1, characterized in that said laminate comprises an embroidered film of a laminate of two different polyester (Mylar) materials.

3. Decorative textile material comprising a textile substrate having stitched to at least one surface thereof, at least one deformable decorative material comprising a curved, tubular plastic element made by a process comprising:
    stitching at least one material decorative element, comprising a deformable material comprising a plurality of layers wherein at least one of said layers shrinks more than other layer(s) during a post-stitching treatment thereof, to a textile base material; and
    subjecting the base material, together with the decorative element of deformable material stitched thereon, to said post stitching treatment by which the material decorative element is bent upon itself into a tubular shape.

4. Decorative textile material according to claim 3, comprising a plurality of deformable decorative elements having random shapes and comprising a planned deformable laminate, at least some of which elements have been caused to become curved into tubular shapes after having been embroidered onto said textile by means of a post embroidery treatment.

5. Decorative textile material comprising a textile substrate having embroidered to at least one surface thereof, at least one deformable decorative material comprising a plastic element, which element comprises a laminate comprising a plurality of layers,
    wherein at least one of the layers shrinks more than other layer(s) during a post embroidery treatment of said article thereby bending said film upon itself to form a tubular structure by means of said post embroidery treatment made by a process comprising:
    attaching at least one decorative element, comprising a deformable plastic material, to a textile base material; and
    subjecting the textile substrate, together with the decorative element comprising the deformable material attached thereon, to a post embroidery treatment by which the deformable decorative element is bent upon itself into a tubular shape.

* * * * *